(12) United States Patent
Craane et al.

(10) Patent No.: US 11,718,163 B2
(45) Date of Patent: Aug. 8, 2023

(54) METHOD AND SYSTEM FOR OBSTRUCTION DETECTION

(71) Applicant: Inalfa Roof Systems Group B.V., Oostrum (NL)

(72) Inventors: Dennie Wilhelmus Hendrikus Craane, Nijmegen (NL); Gerrit Schwepper, Kamp-Lintfort (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/378,034

(22) Filed: Jul. 16, 2021

(65) Prior Publication Data
US 2022/0016961 A1  Jan. 20, 2022

(30) Foreign Application Priority Data
Jul. 16, 2020 (EP) .................................. 20186202

(51) Int. Cl.
  *B60J 7/057* (2006.01)
  *B60J 7/043* (2006.01)
  *H02H 7/085* (2006.01)

(52) U.S. Cl.
  CPC ............. *B60J 7/0573* (2013.01); *B60J 7/043* (2013.01); *H02H 7/0854* (2013.01)

(58) Field of Classification Search
  CPC ......... B60J 7/0573; B60J 7/043; H02H 7/085; H02H 7/0851; H02H 7/0854
  USPC ....................................................... 296/223
  See application file for complete search history.

(56) References Cited

U.S. PATENT DOCUMENTS 7,633,253 B2 * 12/2009 Gunton .................. E05F 15/41
                                                  318/282

FOREIGN PATENT DOCUMENTS

| CN | 108071292 A | 5/2018 | |
|---|---|---|---|
| DE | 4232578 C2 * | 5/1996 | ............. G05D 13/04 |
| DE | 10361062 A1 | 7/2005 | |
| DE | 202004009920 U1 | 11/2005 | |
| JP | 2019170020 A | 10/2019 | |
| WO | WO-0036725 A1 * | 6/2000 | ............ E05F 15/431 |
| WO | 2005071812 A1 | 8/2005 | |

OTHER PUBLICATIONS

European Search Report for corresponding European Patent Application No. 20186202.6 dated Jan. 13, 2021, 31 pages.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A movably arranged vehicle component is operatively coupled to and may be driven by an electric motor. The electric motor is supplied with a motor current to drive the movement of the vehicle component. A method for detecting a movement obstruction comprises the steps of supplying the electric motor with a supply voltage, thereby supplying the motor current; determining a frequency content of the motor current; and analysing the frequency content to determine whether the movement obstruction is present or not. A motor control system is configured to perform the above-mentioned method.

19 Claims, 7 Drawing Sheets

METHOD AND SYSTEM FOR OBSTRUCTION DETECTION

BACKGROUND

The discussion below is merely provided for general background information and is not intended to be used as an aid in determining the scope of the claimed subject matter.

Aspects of the invention relates to a method for detecting a movement obstruction of a movably arranged vehicle component driven by an electric motor and to a motor control system for controlling operation of an electric motor, wherein the electric motor is operatively coupled to a movably arranged vehicle component for moving the vehicle component. Further, the present invention relates to a vehicle roof assembly comprising a moveably arranged component and said motor control system.

Open roof assemblies are well known in the art. The known open roof assemblies are arranged on a roof of a vehicle, wherein an opening is provided in the roof. A moveably arranged closure member is selectively in an open position or in a closed position. In the open position, an interior of the vehicle is in open contact with an exterior of the vehicle, e.g. for providing fresh air in the interior. In the closed position, the interior of the vehicle is closed and protected against rain and other external influences, for example. In the known open roof assembly, the closure member may be (semi-)transparent to allow sunlight to enter the interior, when the closure member is in the closed position.

Commonly, an electric motor is provided and operatively coupled to the closure member to move the closure member between the open position and the closed position. Usually, the closure member is, when moving from the closed position to the open position, first tilted and then the closure member slides towards the open position. The tilting and sliding movement are provided by a suitable mechanism operated by a drive cable, which drive cable is pulled or pushed by the electric motor. Due to the different movements and components of the mechanism, a force exerted by the electric motor may vary along a trajectory of the drive cable. This variation in force complicates a detection of an obstruction preventing the movement of the closure member.

In prior art, a number of methods are disclosed to detect such an obstruction, e.g. an object pinched between the closure member and an edge of the opening in the vehicle roof. In particular, direct detection methods and systems are known, wherein any object in the opening in the roof are directly detected, e.g. by use of a camera or an interruption of a beam of radiation such as infrared light. Indirect methods are known as well. For example, an amount of motor current is compared to a position, in particular a change in position, of the closure member. Such change in position may be determined by determining an amount of rotation of a motor axle or a motor gearing. Such indirect methods may be cost-effective, since they do not require expensive additional components, and may be easily implemented. Due to the above-mentioned variation in forces and related variation in speed, the indirect methods may however be slow or inconsistent. To ensure a safe operation, thresholds for detection may be selected such that likelihood of a false obstruction detection increases.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A reliable and fast method and system for detecting an obstruction that prevents movement of a moveably arranged vehicle component is described.

In a first aspect, a method for detecting a movement obstruction of a movably arranged vehicle component according is described. The vehicle component is operatively coupled to an electric motor such that the electric motor may drive the vehicle component. The electric motor is supplied with a motor current for operation. The method comprises supplying the electric motor with a supply voltage in order to supply the motor current; determining a frequency content of the motor current; and analysing the frequency content to determine whether the movement obstruction is present or not.

The motor current varies over time, irrespective of whether the motor current is an AC current or a DC current. Such variations may be due to motor commutation, force variations in the driving of the movement of the vehicle component or any other cause. Such variations may have a low or a high frequency. By suitable analysis of the motor current, a frequency content of the motor current may be determined. For example, a well-known method to determine a frequency content of a signal is a Fourier transformation, but other techniques and methods are known as well.

It is noted that, in the prior art, a motor current ripple due to motor commutation is used to determine a motor rotation and a related position of the vehicle component. Such a current ripple detection is not within the scope of an analysis of the frequency content of the motor current as used herein. The current ripple generates a main peak in a frequency spectrum at the ripple frequency and related peaks at harmonic frequencies thereof. Determining a frequency of the main peak may be used to determine a rotation speed of the motor axle. Instead, as used herein, analysis of the frequency content includes determining a level or an amount of one or more frequencies in the frequency spectrum.

It has been found that an obstruction preventing the movement of the vehicle component changes a frequency content of the motor current significantly as compared to a situation without an obstruction being present. Hence, suitable analysis of the frequency content of the motor current enables to detect presence of an obstruction easily and quickly.

In an embodiment of the method, the step of analysing comprises the steps of analysing the frequency content to determine whether the frequency content meets a predetermined condition; and, based on the frequency content meeting the predetermined condition or not, determining whether the movement obstruction is present or not. The determined frequency content may be compared to a predetermined threshold, for example. However any other condition may be applied as well. A most suitable condition for simple and fast detection of an obstruction may be dependent on an electric motor type used, the mechanical configuration of the moveably arranged vehicle component and other aspects and properties. It is considered that a skilled person is enabled to compare a frequency content of an unobstructed vehicle component and an obstructed vehicle component and, based on an outcome of the comparison, to select a suitable method to detect the obstruction.

In an embodiment, the step of analysing may comprise a step of comparing the determined frequency content with a previously determined frequency content to determine a change in the frequency content. A determined difference may be used for the determination of the presence of an obstruction. In another embodiment, the determined frequency content may be directly analysed with reference to a previously determined value or the like.

In an embodiment, the analysis is based on a frequency content of frequencies higher than a predetermined lower limit frequency and/or on a frequency content of frequencies lower than a predetermined upper limit frequency. A change of the frequency content may be more pronounced in certain frequencies, which may be dependent on an electric motor type used, the mechanical configuration of the moveably arranged vehicle component and other aspects and properties. It is considered that a skilled person is enabled to compare a frequency content of an unobstructed vehicle component and an obstructed vehicle component and, based on an outcome of the comparison, to identify any frequencies in the frequency spectrum that are most suitable for simple and fast detection.

In a further aspect, the present invention provides a motor control system for controlling operation of an electric motor, wherein the electric motor is operatively coupled to a movably arranged vehicle component for moving the vehicle component. The electric motor is configured to be supplied with a motor current and the motor control system is configured to detect a movement obstruction. An obstruction detection is based on an analysis of a frequency content of the motor current. Thus, the motor control system is configured to perform the above-described method.

In an embodiment, the movement obstruction detection is based on a change in the determined frequency content of the motor current, in particular as compared to a previously determined frequency content.

In an embodiment, the movement obstruction detection is based on a frequency content of frequencies higher than a predetermined lower limit frequency and/or on a frequency content of frequencies lower than a predetermined upper limit frequency. In a particular embodiment, the motor control system comprises a frequency filter for filtering the frequency content of the motor current, wherein the frequency filter comprises at least one of a low-pass filter, a high-pass filter and a band-pass filter. Thus, easily, a particular part of the frequency content may be separated and analysed, wherein it is previously determined that the frequency content in such part of the frequency spectrum clearly changes in case of an obstruction.

In an embodiment, the frequency filter is an analogue filter with the motor current as an input and wherein the motor control system is configured to analyse an output of the frequency filter.

The moveable vehicle component may be any other electrically driven and moveable component like a side window or a tailgate, for example.

In an aspect, the present invention provides a roof assembly for a vehicle roof, the roof assembly comprising a moveably arranged closure member, an electric motor operatively coupled to the closure member and the motor control system according to claim 6 for detecting a movement obstruction, which movement obstruction prevents the closure member from moving.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

BRIEF DESCRIPTION OF THE DRAWINGS

FIG. 1B shows an exploded view of the open roof assembly of

FIG. 1A;

DETAILED DESCRIPTION OF THE ILLUSTRATIVE EMBODIMENTS

Aspects of the present invention will now be described with reference to the accompanying drawings, wherein the same reference numerals have been used to identify the same or similar elements throughout the several views.

Figure 1A:
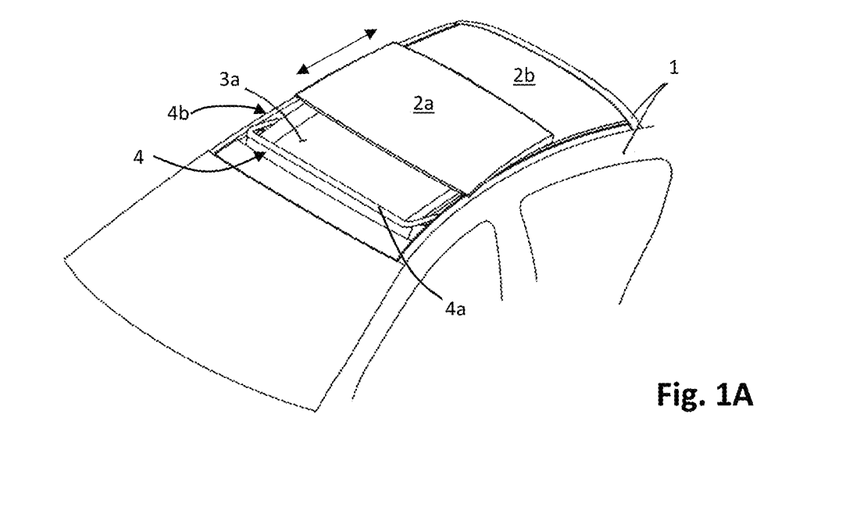
FIG. 1A shows a perspective view of a vehicle roof with an open roof assembly.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
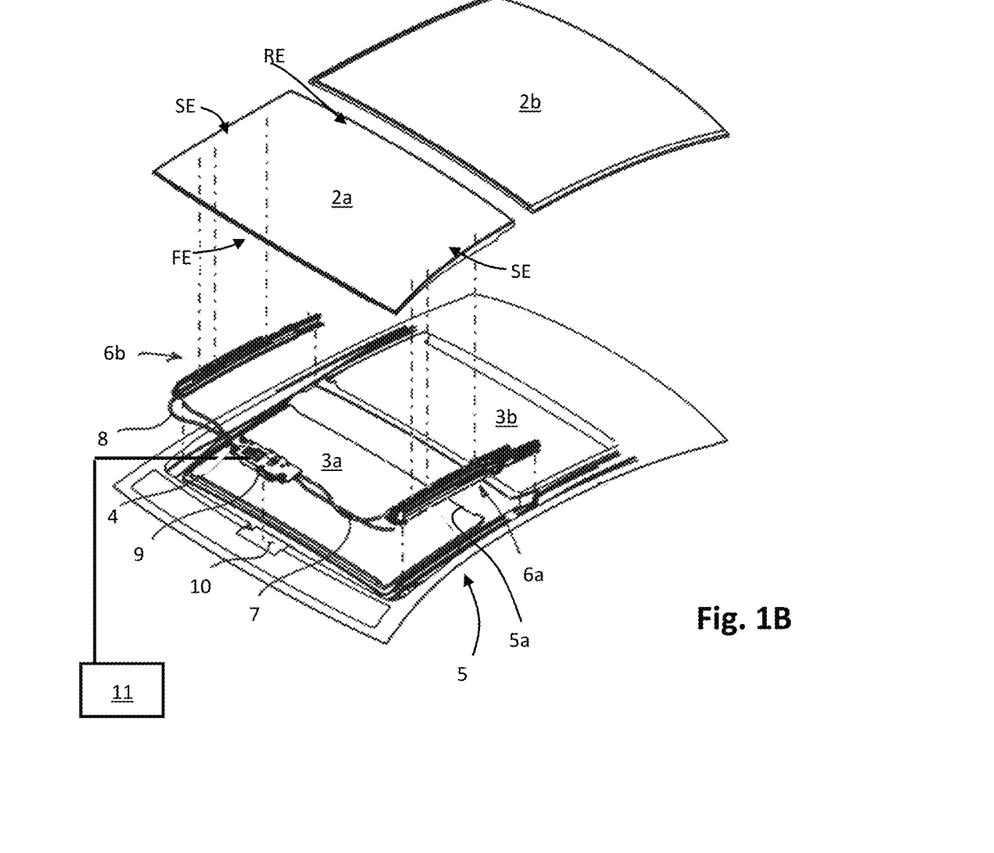

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end FE of the moveable panel 2a at a recess 10. In another embodiment, the electric motor 9 may be positioned at any other suitable position or location. For example, the electric motor 9 may be arranged near or below the rear end RE of the moveable panel 2a or below the fixed panel 2b.

Figure 2:
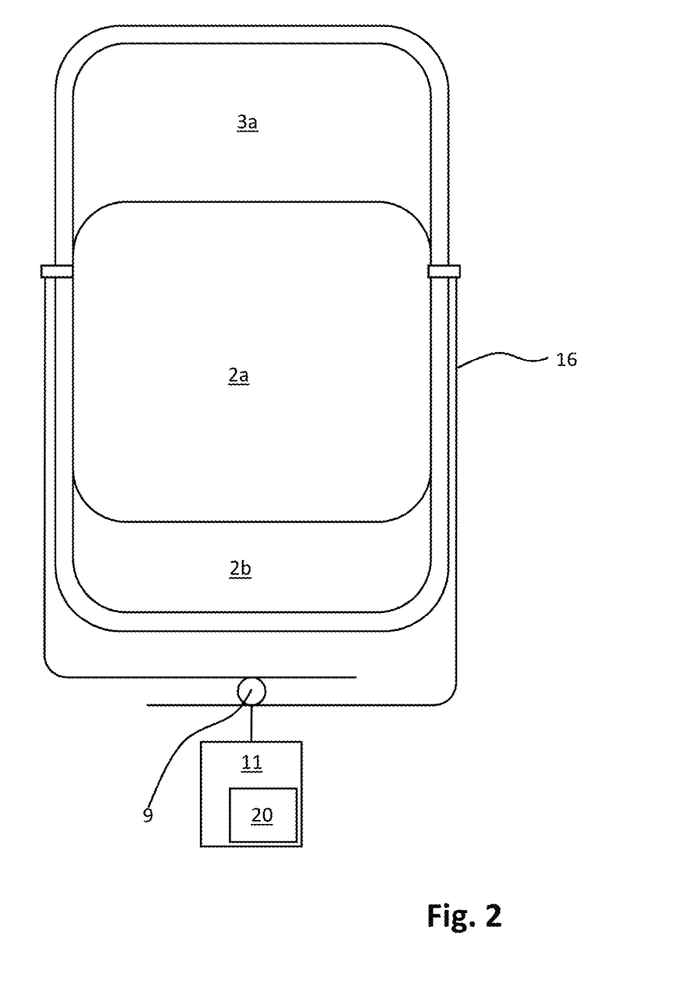
FIG. 2 shows a top view of an open roof assembly for use in a vehicle roof.

FIG. 2 shows a top view of the open roof assembly according to FIGS. 1A and 1B with the moveable panel 2a and the fixed panel 2b. The moveable panel 2a is configured and arranged to selectively cover or open the opening 3a in a vehicle roof. The moveable panel 2a is operatively coupled through a suitable mechanism and a drive cable 16 to the electric motor 9. Operating the electric motor 9 results in a pulling or pushing force of the drive cable 16 on the moveable panel 2a in a well-known manner, which is therefore not further elucidated herein.

The electric motor 9 is operated by the control unit 11 which comprises a motor control system 20. The motor control system 20 is configured to detect an obstruction in a path of movement of the moveable panel 2a, due to which obstruction the moveable panel 2a is not able to move.

Figure 3:
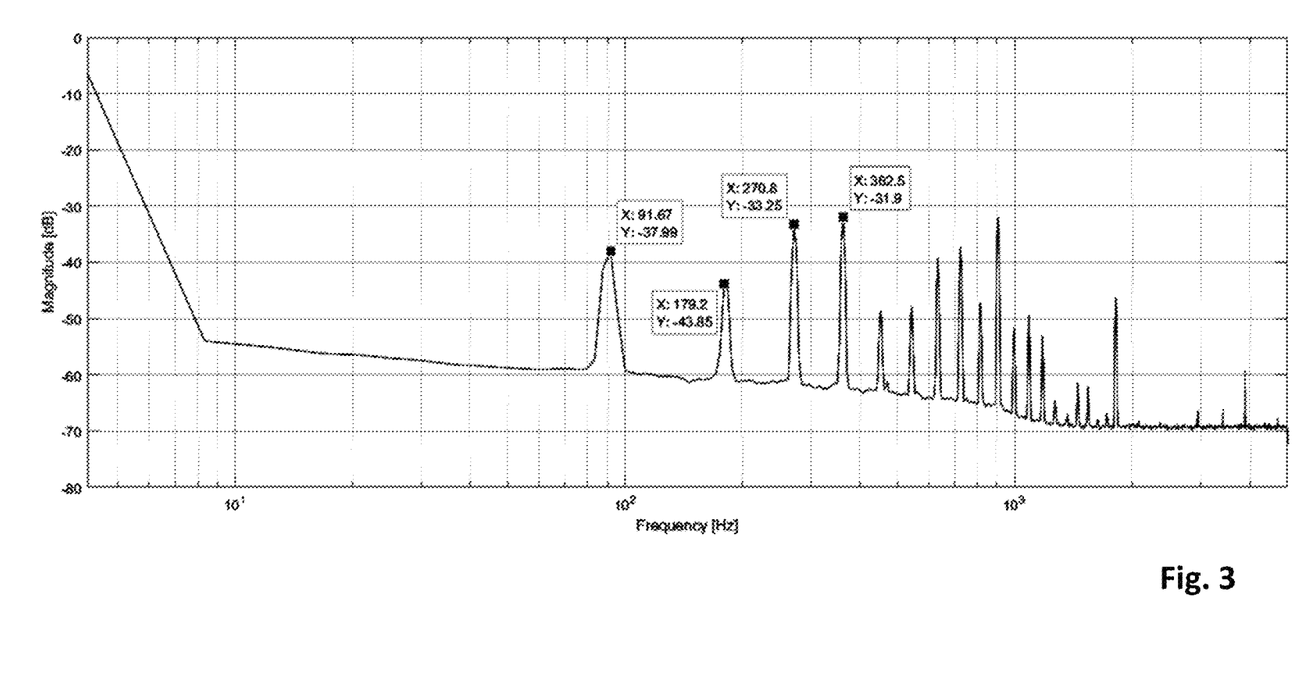
FIG. 3 shows a graph of a frequency content of an embodiment of an electric motor for use in the open roof assembly according to FIG. 2.

FIG. 3 shows a graph showing a frequency content of a motor current as supplied to an electric motor suitable for use in the open roof assembly of FIG. 2. Frequency in Hertz is on a logarithmic scale on the horizontal axis and an amount of contribution/content in dB is provided on the vertical axis.

The shown motor current is determined from an unloaded electric motor. In this example, the electric motor is a DC motor, so a main frequency contribution is at 0 Hz, hence the high value of about −7 dB at the vertical axis (4 Hz) and the decrease of the frequency content to about −54 dB at 8 Hz.

At about 90 Hz, about 180 Hz, about 270 Hz and about 360 Hz, there are peaks in the frequency content, which peaks are due to commutation in the electric motor. So, the first peak at a base frequency of about 90 Hz indicates a speed of rotation of the motor axle, while the peaks at about 180 Hz, about 270 Hz and about 360 Hz correspond to the $1^{st}$, $2^{nd}$ and $3^{rd}$ harmonics of the base frequency, respectively. Higher harmonics are apparent in the graph as well. Apart from the commutation peaks, the frequency content in the motor current gradually decreases from the low frequencies to the higher frequencies.

Figure 4:
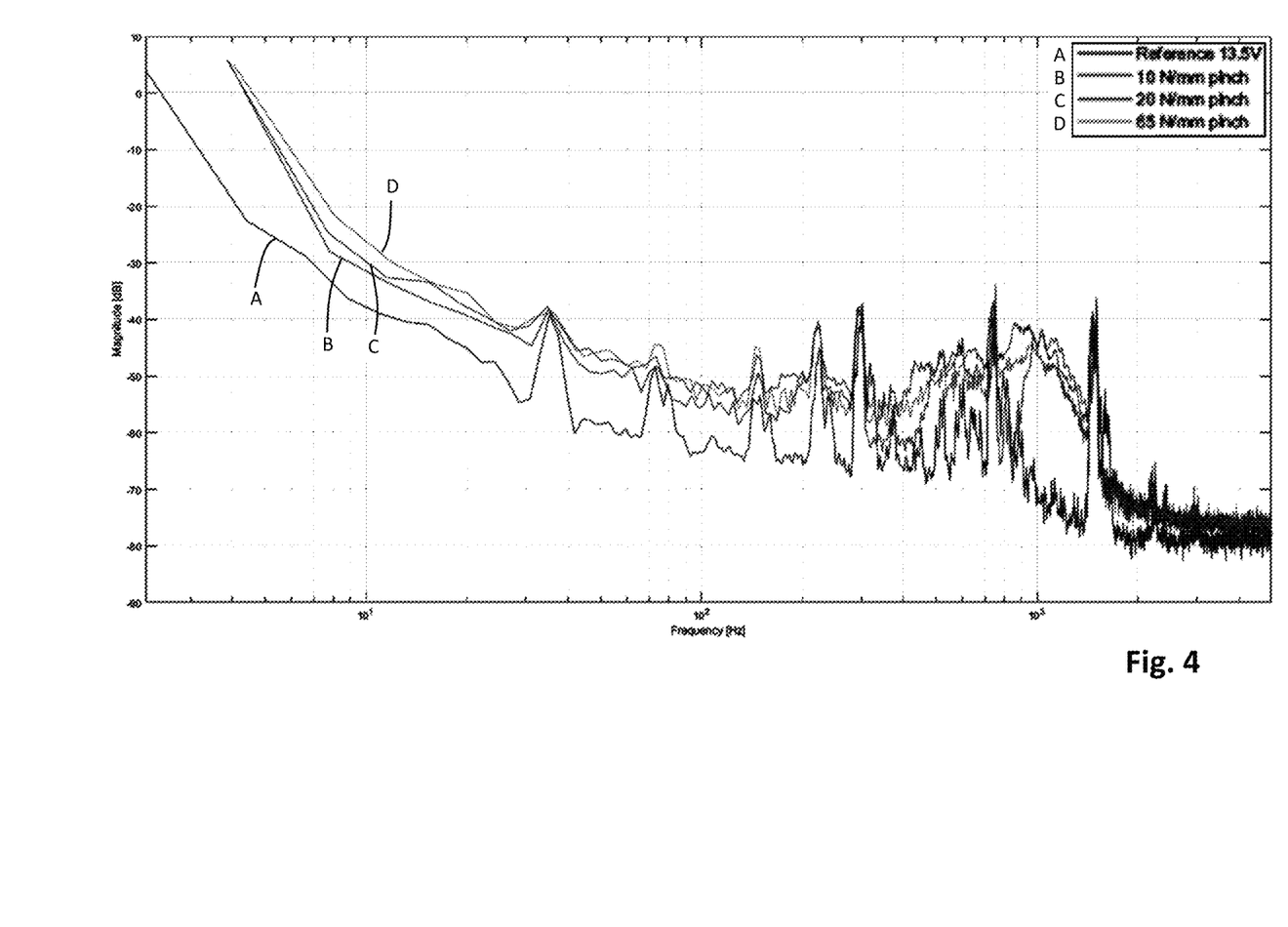
FIG. 4 shows a graph of a frequency content of an embodiment of an electric motor in an open roof assembly according to FIG. 2.

FIG. 4 illustrates a similar graph as shown in FIG. 3 with the same properties on the horizontal and vertical axes. In FIG. 4, four curves A, B, C and D are shown. A first curve A corresponds to the motor current supplied to a loaded electric motor, i.e. an electric motor driving an unobstructed moveable panel of an open roof assembly. Second, third and fourth curves B, C and D, respectively, correspond to motor currents supplied to an electric motor driving an obstructed moveable panel, wherein a stiffness of an obstructing object in a direction of movement of the moveable panel varies. For the second curve B, the stiffness of the object is 10 N/mm; for the third curve C, the stiffness is 20 N/mm; and for the fourth curve D, the stiffness is 65 N/mm. These values for the stiffness are selected in correspondence to certain legal safety requirements in different jurisdictions, in particular in the EU and USA. In other jurisdictions, other values for a stiffness could be relevant and the present invention is not limited in any way to such stiffness.

In comparison to an unloaded operation of the electric motor as shown in FIG. 3, in the loaded operation of curves A, B, C and D, the base frequency has shifted to about 35 Hz. So, the load on the electric motor clearly reduces the speed. Further, the frequency content over the whole frequency spectrum is increased. In particular, for the unobstructed operation of the curve A, lower frequencies have significantly more energy, but energy in the higher frequencies is increased as well.

In the obstructed operation, the energy in the whole frequency spectrum is further increased in comparison to the unobstructed operation as apparent from the second, third and fourth curves B, C and D relative to the first curve A. It is noted that the second, third and fourth curves B, C and D do not significantly differ in their frequency contents and, thus, it appears that the stiffness of an object does not affect a frequency content in the motor current and is therefore not relevant to the obstruction detection. Further, it is noted that the energy (i.e. frequency content) at the above-mentioned base frequency and harmonic frequencies thereof are not increased due to the obstruction. Moreover, some of the peaks of this base frequency and its harmonic frequencies may be hard to identify in the frequency spectrum as a level of such peaks hardly exceed a level of the energy in frequencies in a range about such peaks. Therefore, using the base frequency and its harmonics for position and speed determination may be deemed unreliable if used for obstruction detection.

As above mentioned, the energy in the frequencies over the whole range is increased. In the frequencies up to about 300 Hz, a noticeable increase of about 10 dB is apparent, while in a range from about 300 Hz to about 900 Hz, the difference is less noticeable due to relatively large variations in energy between the different frequencies. In a range from about 900 Hz to about 1.3 kHz, there is a relative large difference in energy levels between the unobstructed operation and the three illustrated obstructed operations. Hence, in this embodiment, a significant difference of about 25 dB is identified in the range from about 900 Hz to 1300 Hz. This significant difference is easily detectable and may be used to detect an obstruction in a path of movement of the moveable vehicle component, in this embodiment the moveable closure member. Beyond the frequency of about 1.3 kHz, there appears to be no difference in frequency content between the unobstructed and obstructed operations.

It is noted that the above indicated frequency range for detecting an obstruction may be dependent on the embodiment, i.e. the combination of the electric motor, gearing, drive cable, closure member, etc. Another drive assembly and vehicle component may excite other frequencies. A person skilled in the art is considered to be enabled to identify such frequencies, e.g. by generating a graph as shown in FIG. 4.

Figure 5A:
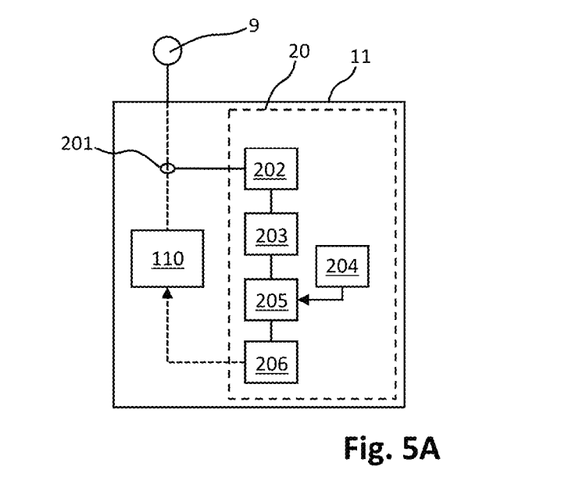
FIG. 5A illustrates an embodiment of a motor control.

FIG. 5A illustrates an embodiment of the control unit 11 as shown in FIG. 1B. The control unit 11 is operatively coupled to the electric motor 9 for driving the electric motor 9 by supplying a motor current to the electric motor 9 using a drive circuit 110. The drive circuit 110 may be any suitable circuit, e.g. in accordance with well-known drive circuits.

The control unit 11 further comprises a motor control system 20 for detecting an obstruction preventing movement of the vehicle component like the moveable closure member 2a of FIGS. 1A and 1B. The motor control system 20 is configured to receive a current signal representative of the motor current as supplied to the electric motor 9. For example, a current sensor 201 may be provided. In a particular exemplary embodiment, the current sensor 201 may be a resistor and the current signal may be a voltage over the resistor. However, any other kind of signal and/or sensing circuit may be employed.

The motor control system 20 comprises a frequency filter 202. The frequency filter 202 is configured to receive the current signal for determining a frequency content in the current signal. The frequency filter 202 may be embodied as a digital filter such that the frequency content may be derived through a digital operation using a processing unit, for example, as well known in the art. In another embodiment, the frequency filter 202 may be embodied as an analogue filter, e.g. a first-order or higher order RC-filter. Selecting suitable values for the resistance of the resistor and for the capacitance of the capacitor defines a cut-off frequency, as well known in the art.

Figure 5B:
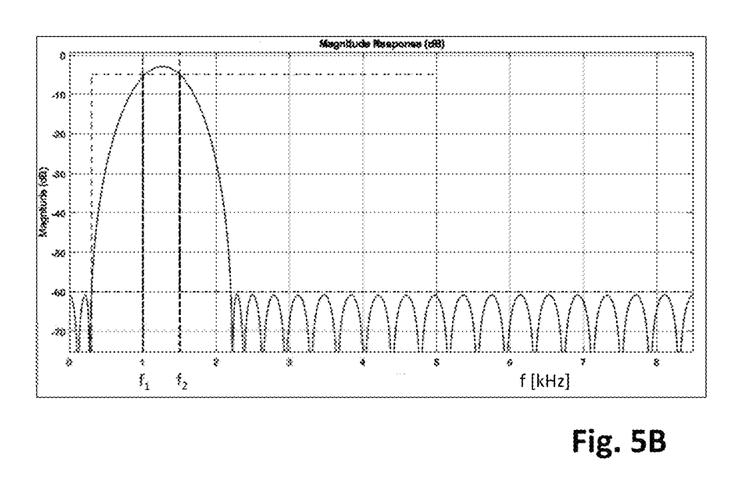
FIG. 5B illustrates filter properties of a frequency filter as used in the embodiment of FIG. 5A.

The frequency filter 202 may be low-pass filter, a high-pass filter or a band-pass filter. For example, with reference to the graph of FIG. 4 and the above description thereof, a band-pass filter designed to let frequencies between about 900 Hz and about 1300 Hz pass would be suitable to detect an obstruction based on the output of the frequency filter 202. FIG. 5B shows an example of a response of a band-pass filter, wherein the frequency filter is designed to allow frequencies between a lower limit frequency $f_1$ and an upper limit frequency $f_2$ to pass, wherein the lower limit frequency $f_1$ is about 1 kHz and the upper limit frequency $f_2$ is about 1.5 kHz. Designing of a suitable filter is well known in the art and is therefore not elucidated herein. Still, depending on the frequencies relevant to the obstruction detection, other values and/or another kind of filtering may be applied.

Referring to FIG. 5A again, optionally, an output operator 203 may be provided. For example, to reduce effects of noise and other accidental variations, the output operator can be a moving average that is determined over a number of output values (in case of a digital output) or a period of time (in case of an analogue output). Other operators may be used as well, depending on the requirements.

The output of the output operator 203 is supplied to a comparator 205. The comparator 205 is further configured to receive a threshold value 204. By comparison of the output of the output operator 203 and the threshold value 204, it is determined whether an obstruction is present by an obstruction detector 206.

In an exemplary embodiment, the threshold value 204 may be a predetermined and static value. When the output of the output operator 203 exceeds the threshold value 204, an obstruction is detected. In another exemplary embodiment, the threshold value may be dynamic or adaptive and may be determined based on or in response to a level of the current signal, for example, or any other signal level or property.

The obstruction detector 206 may receive further inputs such that the obstruction detection may be based on multiple inputs, wherein the obstruction detector 206 may be configured to detect an obstruction if one, multiple or even all inputs indicate the presence of an obstruction. An output of the obstruction detector 206 may be operatively coupled to the drive circuit 110 such that the motor current supply may be switched off or may be reversed, for example.

Figure 6A:
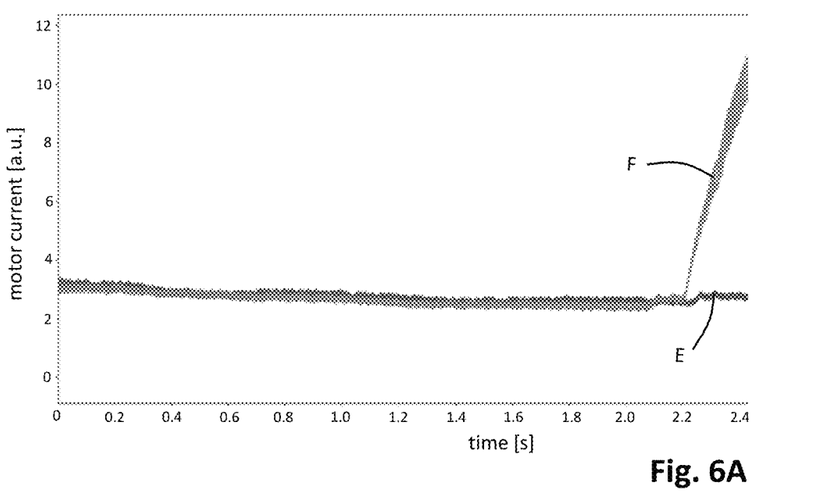
FIG. 6A illustrates a motor current supplied to an electric motor in an open roof assembly according to FIG. 2.
Figure 6B:
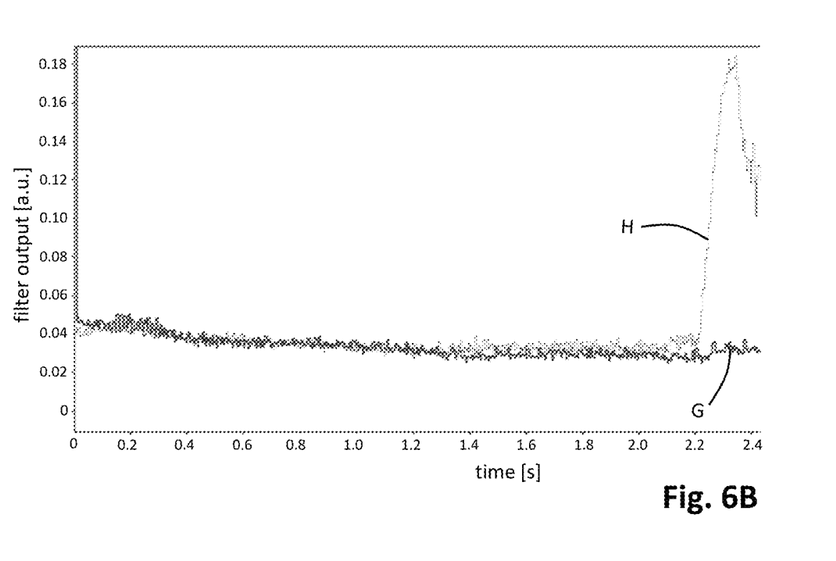
FIG. 6B illustrates a measure of a frequency content filtered from the motor current as illustrated in FIG. 6A.

FIGS. 6A and 6B each show two curves E, F and G, H, respectively. In FIG. 6A, a motor current (in arbitrary units a.u. on the vertical axis) is shown in relation to time (in seconds s on the horizontal axis) and in FIG. 6B, a frequency filter output (in arbitrary units a.u. on the vertical axis) is shown in relation to time (in seconds s on the horizontal axis).

A fifth curve E represents the motor current as supplied to a moving closure member, i.e. a moving vehicle component, in an unobstructed operation. A seventh curve G shows the frequency filter output corresponding to the motor current of the fifth curve E.

A sixth curve F represents the motor current as supplied to a moving closure member, i.e. a moving vehicle component, wherein at a time of about 2.2 s the closure member is obstructed. An eighth curve H shows the frequency filter output corresponding to the motor current of the sixth curve F.

Referring to FIG. 6A, a significant rise in the motor current occurs when the closure member is obstructed. In common obstruction detection systems, this rise in current and usually in combination with a detected reduction in speed and/or by comparison to a reference profile of the expected motor current along the path of movement of the moveable closure member, is used to determine the presence of an obstruction. Referring to FIG. 6B, it is apparent that at the same time of about 2.2 s the frequency content in the selected frequency band, which in this case is the frequency band of 1 kHz-1.5 kHz (cf. FIG. 5B), rises as well. Moreover, the frequency content in this selected frequency band, the rise is more steep than the rise in motor current. Hence, an obstruction may be detected sooner in comparison to the method used by the above-mentioned common obstruction detection systems.

Figure 7:
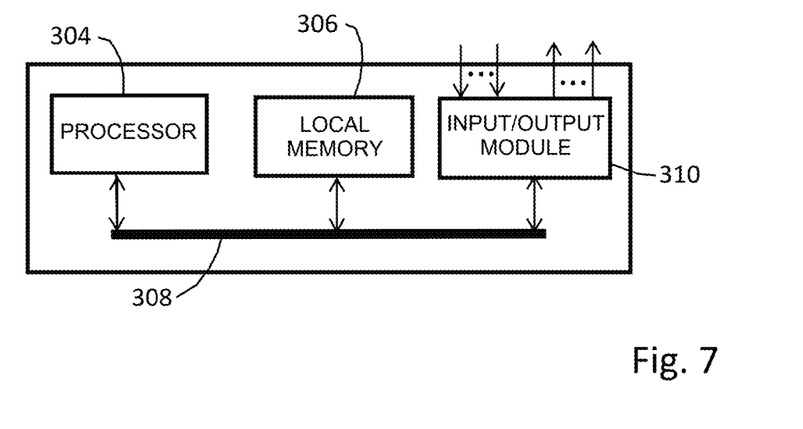
FIG. 7 schematically illustrates a control unit or motor control system.

An embodiment of the control unit 11 or motor control system 20 for performing one or more of the functions described above is schematically illustrated in FIG. 7. the control unit 11 or motor control system 20 may be any kind of processing module, either a software controlled processing module or a dedicated processing module, like an ASIC, which are both well known to those skilled in the art. Generally, a processor 304 is operatively coupled to local memory 106 via a system bus 308. The local memory 106 stores instructions for the processor 304 so as to control operation of the motor 9, doing so by providing an output suitable to control the motor 9 directly, thus performing the function of drive circuit 110 or providing an output usable by any of the components of motor control system 20 embodied as a separate digital and/or analogue circuit. An input/output module 310 also coupled to the system bus 108 can receive signals from the current sensor 201 or other inputs, if so provided. The input/output module 310 is operatively coupled to provide suitable output signals depending on the functional blocks of motor control system 20 being implemented or embodied with software and the processor 104. The instructions are stored on computer readable media or devices forming the local memory 106. The control unit 11 or motor control system 20 may be a stand-alone control module or it may be operatively connected to another control module such a multipurpose, generic vehicle control module. In yet another embodiment, the control unit 11 or motor control system 20 may be embedded in or be part of such a generic vehicle control module. Essentially, the control unit 11 or motor control system 20 may be embodied by any control module suitable for, capable of and configured for controlling operation of the motor 9 as described above.

Further research has revealed that the presently proposed obstruction detection method is less sensitive to external influences. For example, in the embodiment of a moveably arranged closure member of an open roof assembly, speed of the vehicle, road conditions, weather conditions, vehicle torsion, and any other conditions affect the forces needed to move the closure member and thus affect the motor current supplied to the motor. To account for such circumstances and conditions, a safety margin is introduced in the threshold value to prevent that the closure member will erroneously detect an obstruction, when the closure member is moving under such conditions. As the present method is less sensitive to such conditions, a smaller safety margin may be applied and thus the motor control system may be more reliable and may result in reduced forces exerted on the obstructing object.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A method of detecting a movement obstruction of a movably arranged vehicle component driven by an electric motor, the electric motor being supplied with a motor current, the method comprising:
   supplying the electric motor with a supply voltage, thereby supplying the motor current;
   determining a frequency content of the motor current; and
   analysing the frequency content to determine whether the movement obstruction is present or not, comprising filtering the frequency content of the motor current with a frequency filter, comparing a filter output of the frequency filter with a threshold value, and based on a comparison of the filter output of the frequency filter with the threshold value determining whether the movement obstruction is present or not.

2. The method according to claim 1, wherein analysing the frequency content comprises:
- determining a level or an amount of one or more frequencies in a frequency spectrum of the frequency content;
- analysing the frequency content to determine whether the frequency content meets a predetermined condition with respect to the level or the amount of the one or more frequencies in the frequency spectrum; and
- based on the frequency content meeting the predetermined condition or not, determining whether the movement obstruction is present or not.

3. The method according to claim 1, wherein analysing the frequency content comprises comparing the determined frequency content with a previously determined frequency content to determine a change in the frequency content.

4. The method according to claim 1, wherein analysing the frequency content is based on a frequency content of frequencies higher than a predetermined lower limit frequency.

5. The method according to claim 1, wherein analysing the frequency content is based on a frequency content of frequencies lower than a predetermined upper limit frequency.

6. A motor control system for controlling operation of an electric motor, wherein the electric motor is operatively coupled to a movably arranged vehicle component for moving the vehicle component, the electric motor being supplied with a motor current and the motor control system being configured to detect a movement obstruction,
- wherein an obstruction detection is based on an analysis of a frequency content of the motor current,
- wherein the movement obstruction detection is based on a frequency content of frequencies higher than a predetermined lower limit frequency and/or on a frequency content of frequencies lower than a predetermined upper limit frequency,
- wherein the motor control system comprises a frequency filter for filtering the frequency content of the motor current,
- wherein the frequency filter comprises at least one of a low-pass filter determining the upper limit frequency, a high-pass filter determining the lower limit frequency, and a band-pass filter determining the lower limit frequency and the upper limit frequency, and
- wherein the motor control system is configured to compare a filter output of the frequency filter with a threshold value, and based on a comparison of the filter out put of the frequency filter with the threshold value to determine whether the movement obstruction is present or not.

7. The motor control system according to claim 6, wherein the movement obstruction detection is based on a change in the frequency content of the motor current.

8. The motor control system according to claim 7, wherein the frequency filter is an analogue filter with the motor current as an input and wherein the motor control system is configured to analyse an output of the frequency filter.

9. The motor control system according to claim 7, wherein the motor control system comprises a frequency filter configured to filter the frequency content of the motor current, wherein the frequency filter comprises a low-pass filter, a high-pass filter and/or a band-pass filter.

10. A roof assembly for a vehicle roof, the roof assembly comprising a moveably arranged closure member, an electric motor operatively coupled to the closure member, and a motor control system for controlling operation of an electric motor, wherein the electric motor is operatively coupled to a movably arranged vehicle component for moving the vehicle component, the electric motor being supplied with a motor current and the motor control system being configured to detect a movement obstruction,
- wherein an obstruction detection is based on an analysis of a frequency content of the motor current, the analysis comprising filtering the frequency content of the motor current with a frequency filter and comparing a filter output of the frequency filter with a threshold value, and based on a comparison of the filter output of the frequency filter with the threshold value determining whether the movement obstruction is present or not.

11. The roof assembly according to claim 10, wherein the movement obstruction detection is based on a change in the frequency content of the motor current.

12. The roof assembly according to claim 10, wherein the movement obstruction detection is based on a frequency content of frequencies higher than a predetermined lower limit frequency.

13. The roof assembly according to claim 10, wherein the movement obstruction detection is based on a frequency content of frequencies lower than a predetermined upper limit frequency.

14. The roof assembly according to claim 13, wherein the motor control system comprises a frequency filter configured to filter the frequency content of the motor current, wherein the frequency filter comprises a low-pass filter, a high-pass filter and/or a band-pass filter.

15. The roof assembly according to claim 14, wherein the frequency filter is an analogue filter with the motor current as an input and wherein the motor control system is configured to analyse an output of the frequency filter.

16. The roof assembly according to claim 12, wherein the motor control system comprises a frequency filter configured to filter the frequency content of the motor current, wherein the frequency filter comprises a low-pass filter, a high-pass filter and/or a band-pass filter.

17. The method according to claim 4, wherein analysing the frequency content is based on a frequency content of frequencies lower than a predetermined upper limit frequency.

18. The method according to claim 5, wherein analysing the frequency content is based on a frequency content of frequencies in a range from about 900 Hz to about 1.3 kHz.

19. The motor control system according to claim 7, wherein the motor control system comprises a band pass filter, wherein the band pass filter is designed to pass frequencies in a range from about 900 Hz to 1.3 kHz.

* * * * *